United States Patent [19]

Munson

[11] Patent Number: 4,490,582
[45] Date of Patent: Dec. 25, 1984

[54] SPEAKERPHONE CONTROL CIRCUIT

[75] Inventor: Verne E. Munson, Brielle, N.J.

[73] Assignee: AT&T Information Systems Inc., Holmdel, N.J.

[21] Appl. No.: 467,783

[22] Filed: Feb. 18, 1983

[51] Int. Cl.³ .................. H04M 9/08; H04M 1/60
[52] U.S. Cl. ............................................ 179/81 B
[58] Field of Search .................. 179/81 B, 100 L; 381/71, 83, 93, 94, 110; 330/69, 252, 288

[56] References Cited

U.S. PATENT DOCUMENTS

| | | | |
|---|---|---|---|
| 3,171,901 | 3/1965 | Clemency et al. | 179/81 |
| 3,725,585 | 4/1973 | Moniak et al. | 179/81 B |
| 3,751,602 | 8/1973 | Breeden | 179/81 B |
| 3,889,059 | 6/1975 | Thompson et al. | 179/81 B |
| 3,963,868 | 6/1976 | Randmere et al. | 179/81 B |
| 3,970,786 | 7/1976 | Randmere | 179/81 B |
| 4,002,854 | 1/1977 | Penrose | 179/81 B |
| 4,101,735 | 7/1978 | Bridenbaugh | 179/81 B |
| 4,317,959 | 3/1982 | Kuriki | 179/1 VC |

OTHER PUBLICATIONS

"Fumdamental Considerations in the Design of Voiced Switched Speakerphone", A. Busala, *Bell System Technical Journal*, Mar. 1960, vol. 39, pp. 265–294.

*Primary Examiner*—Keith E. George
*Attorney, Agent, or Firm*—Frederick B. Luludis

[57] ABSTRACT

There is disclosed a speakerphone circuit employing precision peak detectors in which the processing of talk down signals and switch guard signals is partitioned in order to accurately control complementary switched gain in the transmit and receive channels to achieve improved sensitivity to talk down switching action by setting a low switching threshold.

14 Claims, 5 Drawing Figures

SPEAKERPHONE CONTROL CIRCUIT

FIELD OF THE INVENTION

This invention relates to speakerphone circuitry and more particularly to an improved voice switch having a linear response to speech signals ranging from a few milli volts to several volts.

BACKGROUND OF THE INVENTION

Four-wire speakerphone circuits using voice switch control are arranged to automatically switch to either a transmit mode or a receive mode based on the level of speech energy present in the respective transmission paths. In prior art circuits, the voice switching decision is made by comparing a Transmit Talk Down (TTD) signal against a Receive Talk Down (RTD) signal. Improvements in speakerphone circuitry led to the inclusion of a Receive Signal Guard (RSG) signal and a Transmit Noise Guard (TNG) signal in the comparison process. These signals account for electro acoustic noise coupled from the loudspeaker to the microphone and background noise received by the microphone and prevent the speakerphone from self-switching. However, the inclusion of these two additional signals in the comparison process degraded the sensitivity of the voice switch.

An unfavorable aspect of degraded voice switch sensitivity is that it allows a loud talker to maintain control of the voice switch and the conversation. As such, the opposite party's speech energy must greatly exceed the talker's speech energy to inject a response. This problem has been further aggravated by the inclusion of a Transmit Switch Guard (TSG) signal in the voice switch comparator to account for signals coupled from the transmit path to the receive path via the speakerphone's four-wire to two-wire hybrid circuit.

Conventional arrangements directed at improving the sensitivity of the voice switch circuit have not been successful, since these circuits still allow loud talker domination of the voice switch and are still unable to distinguish small differences between the level of talk down signals in the presence of switch guard signals. Consequently, as a result of loud talker domination, a short burst of incoming speech signals appearing on the receive channel during a pause in transmitted speech, as is generally the case during natural conversation, does not cause the voice switch to transfer to the receive mode.

The lack of success on the part of prior art circuits to improve the sensitivity of the voice switch circuits is due in part to comparing talk down signals against switch guard signals to effect a switching decision, rather than basing the switching decision on the presence of legitimate signals. Thus, prior art circuits retain high switching thresholds to prevent a speakerphone circuit from self-switching in response to noise and switch guard signals.

As mentioned, the lack of switching sensitivity on the part of prior art circuits has been compounded by the inclusion of a Transmit Switch Guard signal in the comparison process. This aspect of voice switching was first suggested by A. Busala in his article entitled "Fundamental Considerations in the Design of a Voice Switched Speakerphone", dated March, 1960 and published in Vol. 39 at page 266 of the Bell System Technical Journal. An example of the art taught by Busala is disclosed in U.S. Pat. No. 4,002,954, issued to D. J. Penrose on Jan. 11, 1977. Penrose discloses a speakerphone arrangement in which unidirectional signals, derived from the speakerphone transmit and receive channels, are compared to produce a control signal. The control signal, which is based on the strength of the signal being compared rather than on the legitimacy of those signals, is used by Penrose to control the speakerphone transmission mode. In this respect, the Penrose speakerphone circuit is not representative of an advancement over the prior art and is essentially a continuation of that art.

Accordingly, a general object of this invention is to significantly improve the sensitivity of speakerphone circuits in order to promote natural conversation and eliminate loud talker control.

SUMMARY OF THE INVENTION

The stated object and other objects, which are more fully described herein, are achieved by partitioning the comparison process and basing the switching decision on the presence of legitimate speech signals. Talk down signals are derived from speech signals present on each channel and separately compared against an opposite channel switch guard signal. The output from each first level comparator is blocked from reaching a second level comparator if the switch guard signal outweighs the respective talk down signal. An unblocked signal represents the presence of legitimate speech energy on the respective channel. In this manner, the switching decision is based on legitimate signals.

Thus, the improvement allows a low switching threshold to be set thereby attaining linear circuit response over the amplitude of speech signals ranging from several milli volts to several volts.

BRIEF DESCRIPTION OF THE DRAWING

The operation and implementation of the present invention will be more fully apparent and understandable from the following description of the drawings, in which.

GENERAL DESCRIPTION

Figure 1:
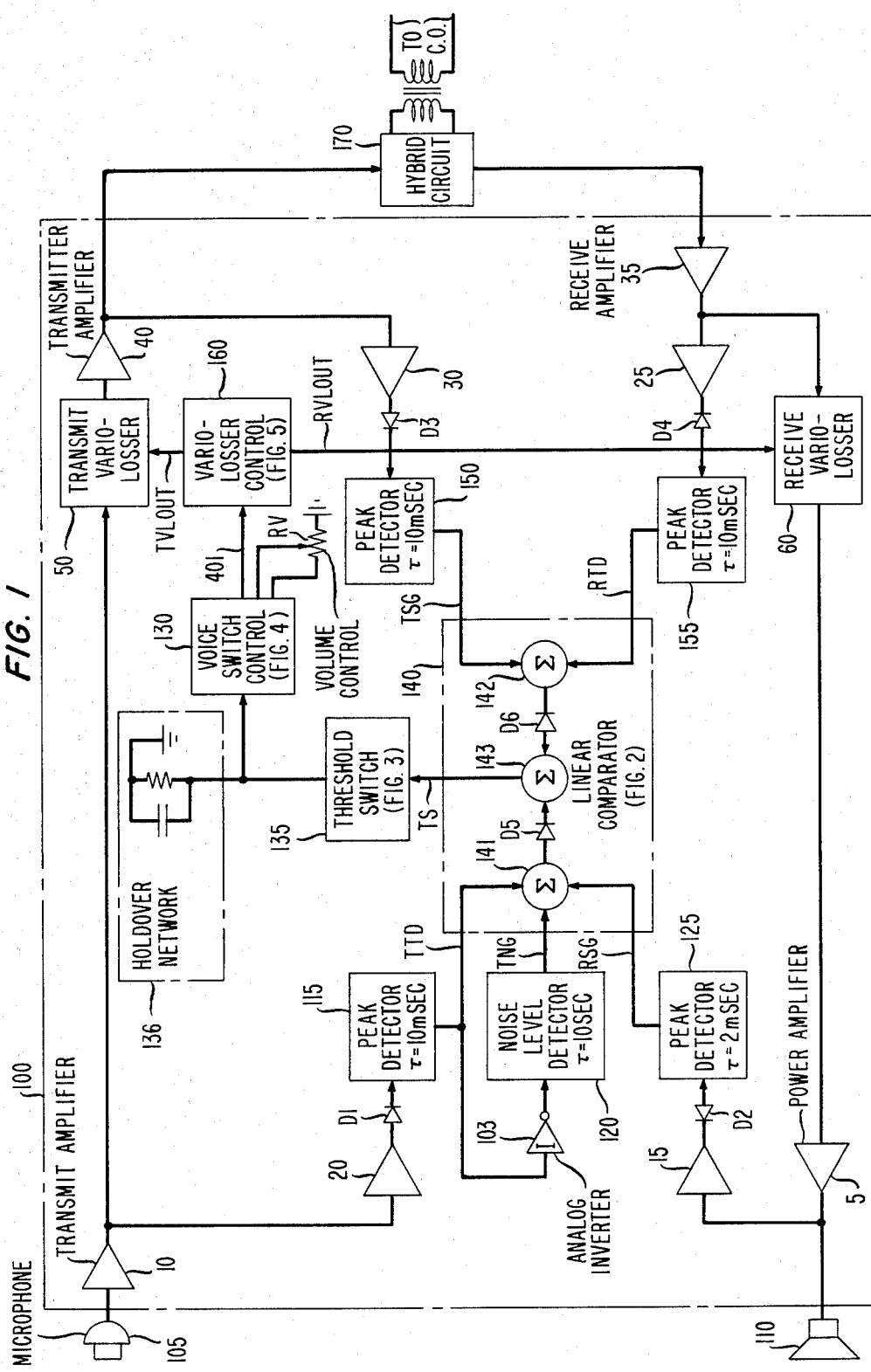
FIG. 1 is a block diagram of the new speakerphone architecture.

Referring to FIG. 1, there is shown speakerphone circuit 100 in accordance with the invention which employs an audio loop and control circuitry. The audio loop comprises a transmit channel and a receive channel. The transmit channel includes microphone 105, microphone preamplifier 10, Transmit Variolosser Circuit 50 and transmit amplifier 40. The receive channel includes loudspeaker 110, power amplifier 5, Receiver Variolosser Circuit 60, and receive amplifier 35. The two channels as described connect to a transmission line, such as a telephone line via hybrid circuit 170. The receive channel provides adequate gain between the line and receiver on loudspeaker 110 and, similarly, the transmit channel provides adequate gain between the transmitter or microphone 105 and the line.

The loop comprising the transmit and receive channels, the coupling across hybrid 170 and electro acoustic coupling between loudspeaker 110 and microphone 105, plus the combination of gain in each channel could result in a loop gain greater than unity thereby establishing a singing condition. To provide adequate margin against the development of a singing condition, it is necessary to control the gain of the respective channels in a complementary fashion.

In operation, the speakerphone normally resides in the receive mode in which variolossers 50 and 60 are adjusted to provide complementary continuous switched loss dependent on the volume control setting. In the receive mode or transmit mode, the loss around the loop is constant. In the transmit mode, the transmit channel has full gain and the receive channel has reduced gain, which means that variolosser 50 is set to, for example, 0 db loss and variolosser 60 is set to, for example, 50 db loss tempered by the setting of volume control RV, which will be described more fully herein.

The means by which speakerphone 100 is switched between the transmit and receive modes is accomplished by control circuitry bridged across the two channels.

Still referring to FIG. 1, transmit channel control amplifiers 20 and 30 provide analog signals from the input and output of the transmit channel to peak detector circuits 115 and 150, respectively, via rectifying diodes D1, D3. Peak detectors 115 and 150 determine the energy level of transmit voice-path signals. The output from peak detector 115 connects to analog inverter 103 for establishing a Transmit Noise Guard (TNG) signal and also connects to linear comparator 140 via the Transmit Talk Down lead, TTD. The output from analog inverter 103 connects to noise level detector 120 for establishing an adaptive threshold signal, called the Transmit Noise Guard (TNG), which is indicative of the level of ambient acoustic noise appearing at microphone 105.

In a like manner, Receiver Channel Control Amplifiers 15 and 25 provide analog signals from the output and input of the receive channel to peak detector circuits 125, 155, respectively, via rectifying diodes D2, D4.

Continuing with FIG. 1, there is shown a functional representation of linear comparator 140 in which summing circuits 141, 142 and 143 represent a partitioned comparator processor having two decision levels. Blocking diodes D5 and D6, which represent the linear comparator 140 signal blocking function, prevent signals which are not representative of legitimate talk down signals from reaching the inputs of summing circuit 143. The outputs of peak detectors 115, 120, and 125 provide the inputs to summing circuit 141 as a means of weighing the speech energy appearing at the input to the transmit channel against the speech energy outputted by the receive channel. This determination prevents speakerphone 100 from self-switching to the transmit mode based on signals acoustically coupled from loudspeaker 110 to microphone 105. Therefore, the output from summing circuit 141 is blocked from reaching summing circuit 143 by functional blocking diode D5 unless that output is representative of true speech signals appearing at the output of amplifier 10.

The outputs of peak detectors 150 and 155 provide the inputs to functional summing circuit 142 as a means of weighing speech energy appearing at the input to the receive channel against speech energy outputted by transmit amplifier 40. This determination prevents speakerphone 100 from self-switching to the receive mode based on signals coupled from the transmit channel to the receive channel via hybrid 170. Therefore, the output from functional summing circuit 142 is blocked by functional blocking diode D6 unless that output is representative of legitimate incoming speech signals appearing at the output of receiver amplifier 35.

Functionally shown summing circuit 143 weighs legitimate unblocked signals outputted from summing circuits 141 and 142 for determining which legitimate signal level, transmit or receive, is greater. The output from summing circuit 143 to threshold switch 135 is a bidirectional current. This current represents the difference in talker signal energy between the transmit and receive channels and is negative if the transmit speech energy is greater than the receive channel speech energy. For the converse case, the current is positive.

Threshold switch 135 ensures that sufficient speech energy is present to warrant switching by comparing the output from summing circuit 143 against a threshold voltage of 35 milli volts. When the speech energy on the standby channel increases sufficiently to cause the output from summing circuit 143 to rise to approximately 35 mv speakerphone 100 will switch to that channel.

The output from threshold switch 135 injects either a positive current, a negative current or no current into holdover network 136, representing transmit, receive or idle respectively. Holdover network 136 introduces a holdover delay for slow fade switching starting at the cessation of transmitted speech and absence of incoming speech signals on the receive channel. The function of holdover network 136 will be further described herein.

Voice switch control circuit 130 makes the final speakerphone 100 transmission mode decision (transmit/receive) with respect to the polarity of the voltage appearing across holdover network 136. Normally, the switching decision effected by voice switch control 130 is controlled by the holdover voltage decaying to a reference voltage switching point, however, immediate switching is effected upon detection of legitimate voice signals on the receive channel. Voice switch 130 outputs one of two possible voltage levels, representing desired transmit or receive channel loss levels, to variolosser control circuit 160. The loss level imposed on the receive channel by variolosser 60 is, as mentioned, tempered by the setting of volume control 145.

Variolosser control circuit 160 is a voltage to current converter for converting the voltage level outputted by voice switch 130 into a loss control current for adjusting the loss level of variolosser 50 and variolosser 60 in a complementary fashion.

DETAILED DESCRIPTION

Each of the amplifiers shown in FIG. 1 can be an operational amplifier, preferably of the type which can be fabricated in integrated circuit form, and operating as voice frequency amplifiers to provide transmission levels compatible with the switched telephone network and to drive loudspeaker 110.

The design of precision peak detectors is well known to the art and each peak detector shown in FIG. 1 can be fabricated from operational amplifier circuits having a fast attack time and release time ($\tau$). Rectification by diodes D1–D4 needs to be "ideal" having a high degree of linearity and ideal rectification characteristics in order to improve the sensitivity of the voice switching action. Peak detector 125 has a longer decay time constant ($\tau$) in order to provide switch guard action as determined by room reverberation time constant to prevent reverberant room energy, picked up by microphone 105, from causing self-switching.

The well known art of designing precision peak detectors is described in the Burr-Brown publication "Operational Amplifier Design and Applications", published by McGraw-Hill Book Company, at pages 353–357.

Noise level detector 120 is a non-linear peak detector having a slow attack time ($\tau = 10$ secs.) and a fast release time.

Figure 5:
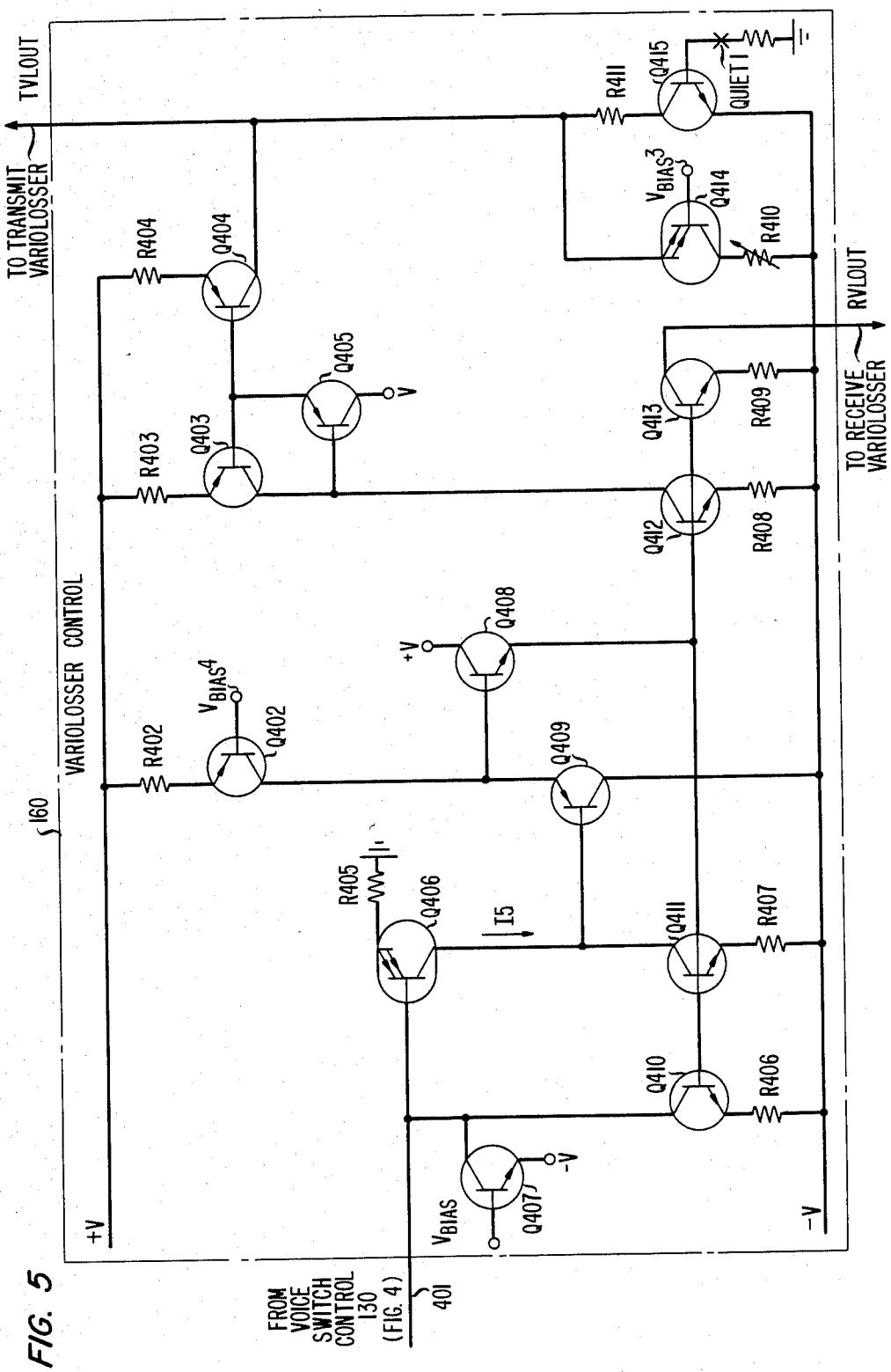
FIG. 5 is a schematic diagram of the variolosser control circuit shown in block diagram form in FIG. 1.

Still referring to FIG. 1, variolossers 50 and 60 are substantially identical and are modified versions of the well known Gilbert multiplier circuit as described in the text *ANALYSIS AND DESIGN OF ANALOG INTEGRATED CIRCUITS* by P. R. Gray and R. G. Meyer and published by John Wiley and Sons. The Gilbert multiplier circuit was modified by substituting bias current sources in parallel with signal current sources for the voltage to current converter differential pair, by cancelling the bias output, currents in the output, by using a current mirror in a feedback arrangement, and by preventing the circuit D.C. operating point from shifting. Variolossers 50 and 60 serve to insert complementary loss into speakerphone 100 transmit and receive channels under control of complementary currents outputted by variolosser control 160 via lead TVLOUT and RVLOUT (FIG. 5). The loss characteristics of variolossers 50 and 60 is predictable since the circuits are driven by complementary currents which vary about a complement value. For example, as the control current outputted via lead TVLOUT goes from 0 $\mu$a to 100 $\mu$a the control current outputted via lead RVLOUT goes from 100 $\mu$a to 0 $\mu$a in such a manner that the sum of the two currents is equal to 100 $\mu$a. Since variolossers 50 and 60 are identical and have a semilogarithmic loss characteristic between inserted loss and control current, a fixed percentage change in control current produces a fixed percentage change in loss, when loss is expressed in db. Variolossers 50 and 60 track in a complementary fashion providing constant loop gain and maintaining loop stability as well as a margin against acoustic return echo.

Figure 2:
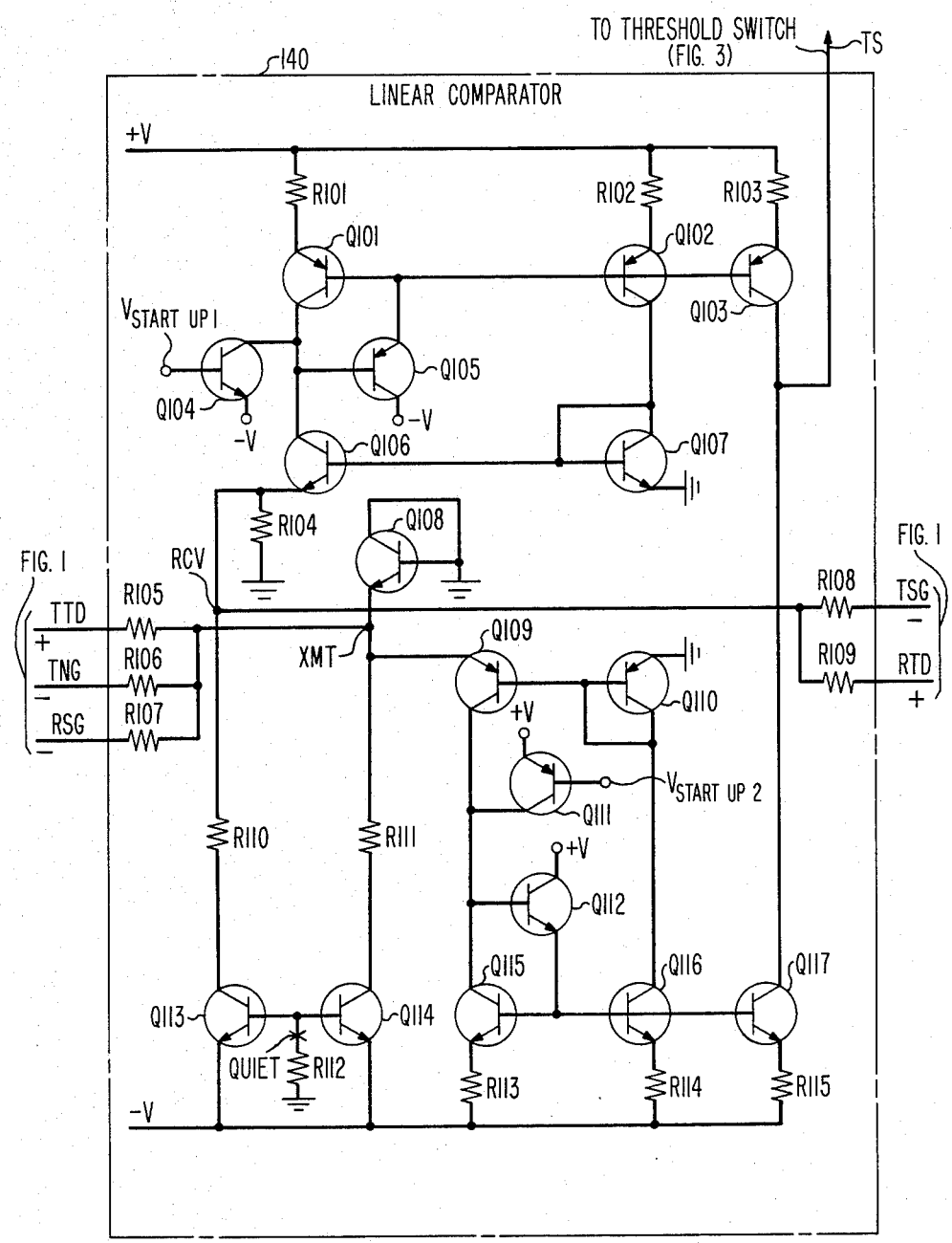
FIG. 2 is a schematic diagram of the linear comparator circuit shown in block diagram form in FIG. 1.

Turning now to FIG. 2, there is shown a detailed schematic diagram of linear comparator 140. Linear comparator 140 is a precision rectification and summing circuit in which a first group of incoming signals (TTD, TNG and RSG) are independently weighted and summed with the result being rectified and compared against a rectified signal resulting from an independent weighting and summation of a second group of signals (TSG and RTD). Since the top half and the bottom half of circuit 140 are essentially mirror images a description of either half of the circuit will be equally applicable to the opposite half of circuit 140.

Resistors R105, R106 and R107 serve to convert a group of voltages on leads TTD, TNG and RSG outputted from peak detectors 115, 120 and 125, respectively, with the polarity shown, to current signals for summing at node XMT. The polarity of the voltages inputted to circuit 140 is determined by the polarity of the rectifying peak detectors (shown in FIG. 1) and corresponds to the polarity of functionally shown diodes D1–D4. Summation of the currents is made possible since node XMT is held at virtual ground potential by transistor Q109. The currents summed at node XMT then flow in the emitter electrode of transistor Q109.

Diode connected transistor Q110 is a linearity compensating device which varies the base voltage of transistor Q109 in a manner that maintains the emitter electrode of transistor Q109 at virtual ground. The virtual ground occurs because the base electrodes of transistors Q109–Q110 are connected together, because the emitter electrode of transistor Q110 is connected to ground and because transistors Q109 and Q110 are forced to operate at identical current levels thereby making the base to emitter voltages of devices Q109 and Q110 virtually equal. Therefore, the emitter electrode of transistor Q109 is always at or near virtual ground irrespective of the current passed by transistor Q109. Current is passed by transistor Q109 whenever the summation of currents at node XMT results in a positive current which is indicative of the presence of a legitimate talk down signal (TTD) of sufficient magnitude to offset noise (TNG) and switch guard (RSG) signals. Conversely, a TTD signal of insufficient magnitude to offset noise and switch guard signals results in a negative current at node XMT causing transistor Q109 to cut off.

Current flowing through the emitter to collector circuit of transistor Q109 is passed by transistor Q115, which is one branch of the well known current mirror circuit comprised of transistors Q115–Q117 and associated resistors R113–R115. Transistor Q117 mirrors the current flowing through transistors Q109 and Q115 and changes the polarity of the current for outputting to threshold switch 135 (FIG. 3) via lead TS. The current flowing through transistor Q115 is also mirrored by transistor Q116 and is then injected into diode connected transistor Q110.

Whenever the current at node XMT becomes negative or starts to flow out of the emitter electrode of transistor Q109, transistor Q109 cuts off sharply and essentially zero current flows in the circuit comprised of transistors Q109, Q110, Q112, Q115, Q116, and Q117. This cut off feature is functionally represented by diode D3 of circuit 140 shown in FIG. 1. Conversely, when the current at node RCV becomes positive transistor Q106 cuts off and no current flows through that transistor and associated circuitry. The rectification by transistor Q106 is functionally represented by diode D6 shown in FIG. 1.

Transistors Q104 and Q111 are "start up" devices for injecting currents into their respective current mirror circuits to insure that the circuit converges to a non-zero operating point upon power-up.

The current passed by transistor Q103, which is essentially the mirror image of the current passed by transistor Q106 and which is representative of the presence of receive channel voice energy, is opposite in polarity to the current that flows through transistor Q117. Since these two current signals are of opposite polarity, the difference between the two current signals is outputted via lead TS to circuit 135.

Transistors Q113 and Q114 together with resistors R110–R112 provide the well known quieting function which is under control of the user. Operation of switch QUIET injects a negative current into node XMT via transistor Q114 causing transistor Q109 to cut off and placed in a nonconducting state. An absence of current flowing in transistor Q109 is reflected as an absence of current flowing through transistor Q115, which, in turn, is reflected as an absence of current in transistor Q117. The operation of switch QUIET also injects a negative current into node RCV via transistor Q113 which is passed by transistor Q106 into the current mirror comprised of transistors Q101-Q103 and resistors R101-R103. The net current injected into node TS by transistors Q103 and Q107 is outputted to threshold switch 135 via lead TS. In this manner, speakerphone 100 is forced into the receive mode during the operation of the QUIET switch.

Resistor R104 connected to node RCV balances the group of two inputs of R108 and R109 with respect to the grouping of three inputs comprised of resistors R105-R107.

Figure 3:
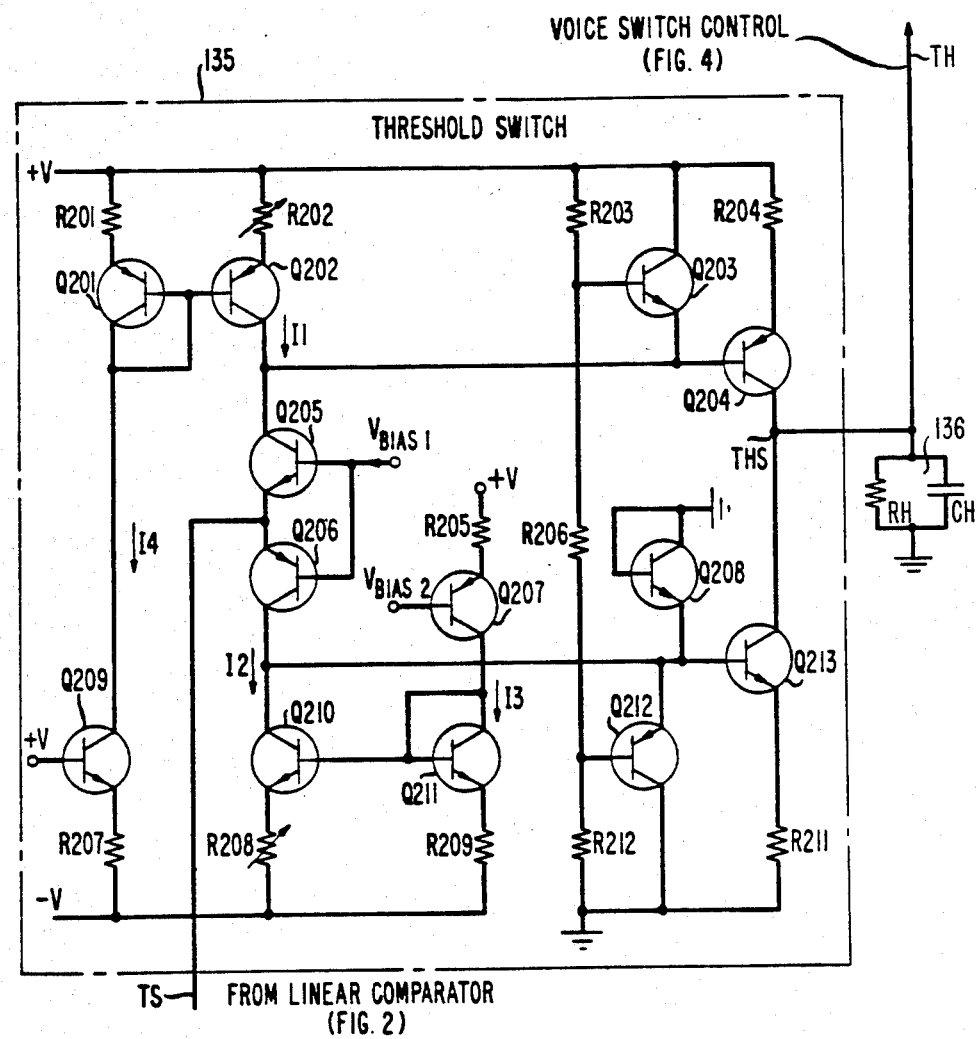
FIG. 3 is a schematic diagram of the threshold switch circuit shown in block diagram form in FIG. 1.

Referring now to FIG. 3, there is shown a detailed schematic drawing of threshold switch 135 which compares the current outputted from linear comparator 140 via lead TS against a transmit threshold and a receive threshold. As mentioned, the current outputted by circuit 140 is negative if speech energy is present on the transmit channel and is positive if speech energy is present on the receive channel. The current outputted by circuit 140 also reflects the difference in magnitude between the speech energy simultaneously present on the transmit and receive channels. Therefore, to insure that sufficient speech energy is present the bidirectional current outputted from circuit 140 is compared against a 35 $\mu a$ threshold current and switching occurs only if the threshold is exceeded.

The output current via lead TH is one of three states representing transmit, idle, or receive which, in turn are represented by approximately plus one milliamp, zero milliamp and minus one milliamp, respectively, being injected into holdover network 136 comprised of resistor RH and capacitor CH. The threshold, or holdover, network is placed external to circuit 135 in order to vary the holdover network time constant.

Transistors Q205 and Q206 are arranged in the common base configuration and both are biased by bias voltage $V_{BIAS1}$. Transistors Q205 or Q206 steer current inputted via lead TS to either the base electrode of transistor Q204 or to the base electrode of transistor Q213. If the input current is positive, transistor Q206 conducts, on the other hand, if the input current is negative transistor Q205 conducts.

Transistors Q210 and Q211 together with resistors R208 and R209 are arranged as the well known current mirror circuit. The current source comprised of transistor Q207 and resistor R205 serves to provide a constant receive threshold current $I_3$ of approximately 25 $\mu a$ into diode connected transistor Q211, which is mirrored by transistor Q210 as represented by current $I_2$. Resistor R208 is laser trimmed to accurately define the value of current $I_2$ and $I_3$. Therefore, a positive current (receive) inputted via lead TS needs to be of sufficient magnitude to provide current $I_2$ and to provide a difference current sufficient to forward bias the base to emitter junction of transistor Q213, thereby causing that device to conduct. Transistor Q213 in the conducting state discharges holdover network 136 toward ground through resistor R211, which serves to switch speakerphone circuit 100 to the receive channel.

In the idle state during which lead TH supplies no current transistor Q208 conducts to supply transistor Q210 with sufficient current to mirror current $I_2$. In the conducting state transistor Q208 serves to reverse bias the base to emitter junction of transistor Q213 to insure nonconductivity of transistor Q213 during the idle state.

Still referring to FIG. 3, transistors Q201 and Q202 together with resistors R201 and R202 are arranged as a current mirror circuit, in which resistor R202 is laser trimmed in order to define the value of transmit threshold current $I_1$. Transistor Q209 and resistor R207 acts as a constant current source to regulate current $I_4$. Unlike the bottom half of circuit 135, i.e., current $I_2$, current $I_1$ flows only when transistor Q205 conducts due to a negative input current from linear comparator 140 via lead TS. During the idle or receive states, in which transistor Q205 is nonconducting, transistor Q202 saturates and current $I_2$ is zero.

When sufficient voice energy appears on the transmit channel of speakerphone 100, linear comparator 140 will draw current from circuit 135 via lead TS through the base emitter junction of transistor Q205 causing that transistor to turn on. Transistor Q205 in the conducting state allows current $I_1$ to flow, however transistor Q206 remains in the nonconducting state. Transistor Q204 conducts and injects approximately one milliamp of positive current into lead TH when linear comparator 140 sinks sufficient current to supply a threshold of current $I_1$ of 25 $\mu amps$. In essence, speakerphone 100 only switches to the transmit mode when sufficient voice energy appears on that channel to cause linear comparator 140 to draw a current from threshold switch 135 via lead TS which is at least equal to current $I_1$ plus the base current required to turn on transistor Q204.

Circuit elements Q203 (Q212) together with resistors R203 (R206 and R212) limit the collector current of transistor Q204 (Q213) to approximately one milliamp.

Figure 4:
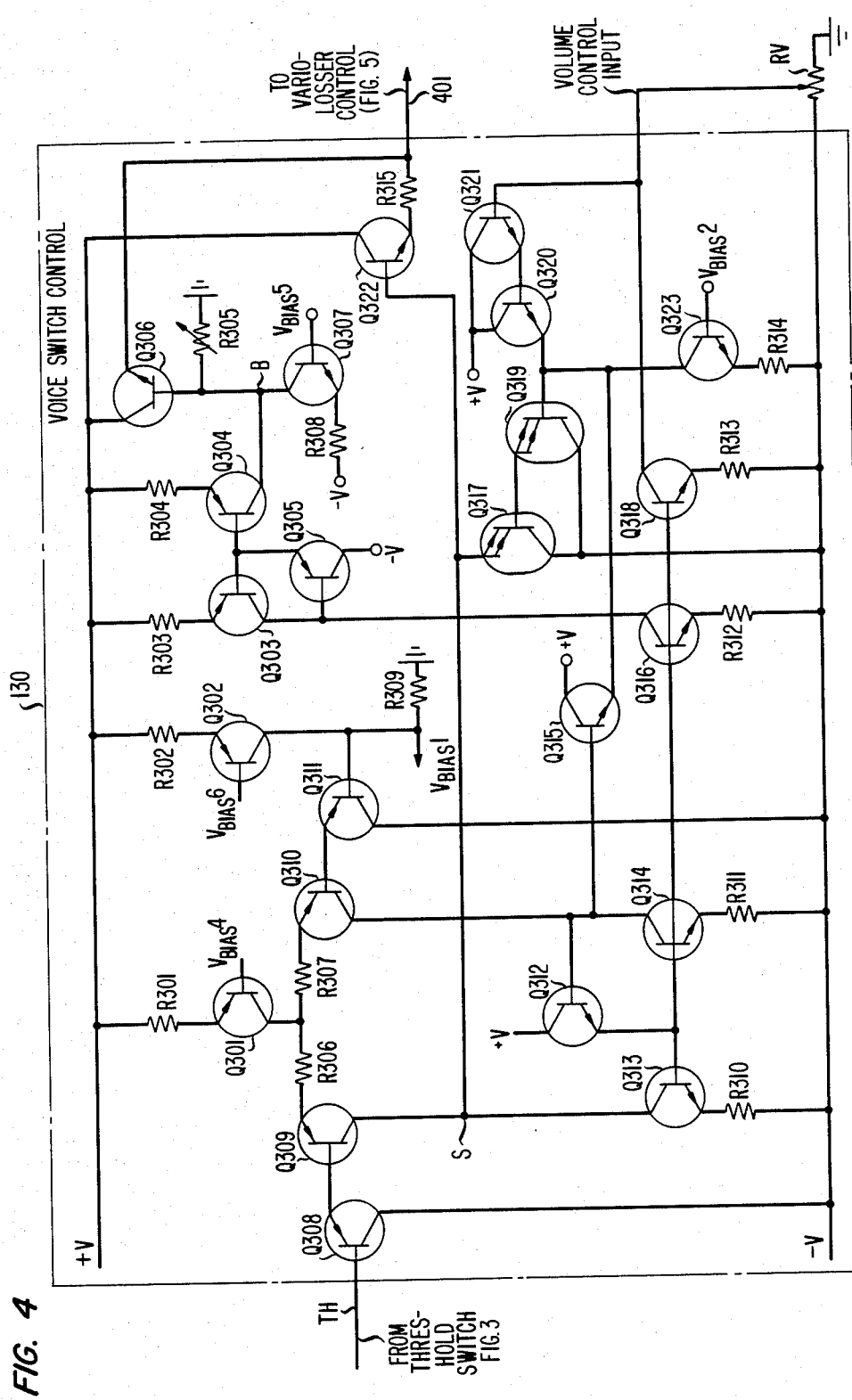
FIG. 4 is a schematic diagram of the voice control switch circuit shown in block diagram form in FIG. 1.

Referring now to FIG. 4, transistors Q308 and Q309 and transistors Q310 and Q311 with resistors R306 and R307 form a differential comparator. Transistor Q301 and resistor R301 serve as a 25 $\mu a$ current source. Transistors Q313 and Q314 with resistors R310 and R311 are arranged as a current mirror to provide an active load to the differential comparator. Transistor Q312 serves as a base current helper. Transistor Q302 with resistor R302 acts as a voltage source for establishing a comparator threshold voltage ($V_{BIAS1}$) across resistor R309 and at the base of transistor Q311.

The current mirror comprised of transistors Q303-Q305 with resistors R303 and R304 operate to mirror the control current supplied by transistor Q316, which activates or deactivates the transmit level clamp comprised of transistor Q306 with laser trimmable resistor R305, as described more fully herein. Transistor Q307 and resistor R308 act as a current source for establishing a negative transmit reference voltage at the base of common base connected transistor Q306 whose emitter electrode connects to output lead 401. The receive level clamp comprised of common base connected transistor Q322 with resistor R315 establishes a voltage on lead 401 indicative of the receive mode which is converted into complementary currents by variolosser control circuit 160. As mentioned, transistors Q306 and Q322 operate to establish a voltage on lead 401 indicative of either the transmit mode or receive mode respectively. Therefore, either transistor Q306 or Q322, but not both, conduct. In the idle mode both transistors Q306 and Q322 are nonconducting and the voltage on lead 401 is zero.

Darlington connected transistors Q320 nd Q321 and Darlington connected transistors Q317 and Q319 form a voltage level buffer having a high input impedance, low output impedance and low offset voltage for buffering the voltage established by the volume control potentiometer RV from the volume control mode to the base of transistor Q322. The emitter areas of transistors Q317 and Q319 are made twice as large as the emitter areas of transistors Q320 and Q321 to match the base to emitter voltages of the two Darlington connected circuits.

Transistor Q318 with resistor R313 is operative during the transmit mode for disabling the volume control voltage established by volume control potentiometer RV. The current source comprised of transistor Q323 biased by voltage $V_{BIAS2}$ with resistor R314 biases the volume control voltage level buffer. Transistor Q315 prevents transistor Q323 from saturating during the transmit mode in which Darlington connected transistors Q317, Q319, Q320 and Q321 are cut off.

Still referring to FIG. 4, the current provided by transistor Q301 with resistor R301 and biased by $V_{BIAS4}$ is steered through transistor Q310 whenever the holdover voltage connecting to the base of transistor Q308 is above the threshold voltage established across resistor R309. Transistor Q310 conducting forward biases devices Q312 and Q315. Transistor Q312, in turn, forward biases the base emitter junction of transistors Q313 and Q314. Transistors Q308 and Q309 are reverse biased by the positive voltage applied to the input of circuit 130 and are nonconducting. Transistor Q313 in the conducting state extends a negative voltage to node S thereby reverse biasing transistors Q317, Q319 and Q322 placing those transistors in the nonconducting state.

The forward bias applied to transistor Q314 is also applied to transistors Q316 and Q318 causing those devices to conduct. As mentioned, transistor Q318 in the conducting state deactivates the volume control voltage supplied via potentiometer RV applied to the base electrode of transistor Q321. Transistor Q315, as mentioned, prevents current source Q323 from saturating.

Transistor Q316 (Q313) collector current is mirrored by transistor Q304 which raises the voltage at node B from a negative voltage toward ground potential which is buffered by transistor Q306 to lead 401 where it is applied to variolosser control circuit 160.

For the receive mode, a ground potential from circuit 135 is applied to the base of transistor Q308 causing transistors Q308 and Q309 to conduct. A ground potential or zero voltage applied to the input of circuit 130 cuts off transistor Q310 due to the bias voltage established across resistor R309 by bias voltage $V_{BIAS1}$. Transistor Q310 placed in the nonconducting state cuts off transistors Q315 and Q312 thereby removing the forward bias applied to the base to emitter junctions of transistors Q313, Q314, Q316 and Q318.

Transistor Q309 collector current flows in the emitter electrode of transistor Q317 thereby causing the receive voltage level buffer (Q317, Q319, Q320 and Q321) to conduct. The receive voltage level buffer in the conducting state extends the voltage established by the setting of volume control potentiometer RV to lead 401 via buffer transistor Q322. Thus, unlike the transmit state which extends a negative voltage to lead 401, the receive mode extends a voltage which is dependent on the volume control setting. Thus, in the receive mode, the loss inserted in speakerphone 100 receive channel via variolosser 60 can be varied dependent on the volume control setting of RV.

Continuing with FIG. 4, transistor Q316 in the conducting state, activates the transmit level clamp Q306 by activating the mirror circuit comprised of transistor Q303 and Q304. Transistor Q304 in the conducting state injects a current at a node B which allows the voltage at node B to return to a level which is also defined by transistor Q307 and resistor R305.

Turning now to FIG. 5, there is shown variolosser control circuit 160 for converting a voltage outputted from voice switch control circuit 130, which varies from approximately 0 volts to −4 volts, into complementary currents outputted via leads TVLOUT and RVLOUT. These complementary currents operate to vary the loss of variolossers 50 and 60 in a complementary fashion.

Transistor Q406 and resistor R405 converts the voltage on lead 401 (−0.7 V to −4.7 V) into a current $I_5$ which varies (0-1000 μa) in proportion to the applied voltage. Current $I_5$ is mirrored by devices Q410-Q413, since these devices with resistors R406-R409 form the well known multiple-output current mirror circuit. Transistor Q402 biased by voltage $V_{BIAS4}$ with resistor R402 and devices Q408 and Q409 act as a low-voltage base current helper to the current mirror circuit and prevents transistor Q406 from saturating when the voltage on lead 401 is at or near −4.7 volts.

The collector current from transistor Q413 is outputted via lead RVLOUT causing variolosser 60 to establish a loss setting proportional to that current. In a similar fashion variolosser 50 establishes a loss setting that complements the loss setting established by variolosser 60. Therefore, the current outputted via lead TVLOUT complements the current outputted via lead RVLOUT. PNP transistors Q403-Q405 with resistors R403-R404 form the well known current mirror circuit for establishing a current in transistor Q404 that is equal to the current that is outputted via transistor Q413, but of opposite polarity.

To establish a transistor Q404 collector current equal and opposite to the collector current of transistor Q413, current mirror Q403-Q404 mirrors and changes the polarity of the collector current of device Q412.

Transistor Q414 biased by voltage $V_{BIAS3}$ with laser trimmed resistor R410 is a constant current source for injecting a positive current of 100 μa into lead TVLOUT, which is offset by the collector current of transistor Q404. In this manner, the current outputted via lead TVLOUT is a complement of the current outputted via lead RVLOUT. That is, the sum of the currents outputted via leads TVLOUT and RVLOUT is equal to 100 μa. Therefore, for example, if the current outputted via lead RVLOUT is 40 μa, the current outputted via lead TVLOUT is 60 μa.

When the circuit is in the QUIET mode, contact QUIET1 is operated for forward biasing transistor Q415. Transistor Q415 in the conducting states forces loss control lead TVLOUT to go negative by approximately one half of a volt causing variolosser 50 to impose maximum loss in the transmit channel.

CONCLUSION

It is to be understood and apparent that the embodiment of the invention described herein is merely illustrative of the principles of the invention. Various modifications thereto may be effected by persons skilled in the art without departing from the spirit and scope of the invention.

What is claimed is:

1. A speakerphone circuit having a transmit circuit and a receive circuit connectable to a telephone line, wherein said transmit and receive circuits include means for independently controlling the loss of said transmit and receive circuits, said speakerphone circuit comprising means for generating from said transmit circuit a transmit talk down signal representative of a voice signal present on said transmit circuit, a transmit noise guard signal representative of acoustical ambient background noise, and a transmit switch guard signal representative of voice signals coupled from said transmit circuit to said receive circuit, means for generating from said receive circuit a receive talk down signal representative of voice signals present on said receive circuit and a receive switch guard signal representative of a voice signal coupled from said receive circuit to said transmit circuit, means for summing said transmit talk down signal and said noise guard signal with said receive switch guard signal and for providing a first signal equal to the resulting sum, means for inhibiting said first signal when the sum of said noise guard and receive switch guard signals outweigh said transmit talk down signal, means for summing said receive talk down signal and said transmit switch guard signal and for providing a second signal equal to the resulting sum, means for inhibiting said second signal when said transmit switch guard signal outweighs said receive talk down signal, means for combining said first signal with said second signal when neither of said signals is inhibited and for providing a difference signal corresponding to the difference between the values of said first and second signals, and means responsive to said difference signal for generating first and second loss control signals having a complementary relationship for controlling the loss of said transmit and receive circuits, said loss control signal generating means including circuitry for blocking said difference signal if said difference signal does not exceed a predetermined threshold and for providing at a first terminal a voltage the magnitude of which is controlled by the polarity of said unblocked difference signal.

2. The invention set forth in claim 1 wherein said voltage is supplied to a resistor and capacitor threshold network connected to said first terminal.

3. The invention set forth in claim 2 wherein said generating means further includes circuitry for providing a constant voltage to a second terminal in response to a first voltage level across said threshold network and for providing a varying voltage to said second terminal in response to a second voltage level across said threshold network.

4. The invention set forth in claim 3 wherein said complementary relationship is fixed with respect to said constant voltage and variable with respect to said varying voltage.

5. The invention set forth in claim 3 wherein said varying voltage is controlled by a volume control potentiometer.

6. The invention set forth in claim 1 wherein said transmit talk down signal generating means includes at least one peak detector circuit.

7. The invention set forth in claim 1 wherein said receive talk down signal generating means includes at least one peak detector circuit.

8. A loudspeaking circuit having a transmit channel and a receive channel connectable to a telephone line via a hybrid circuit, wherein said transmit channel includes a microphone and a variolosser circuit with a transmit amplifier interposed therebetween and wherein said receive channel includes a loudspeaker and a receive variolosser with a receive amplifier interposed therebetween, comprising means for summing a first group of particular signals of different polarities derived from said transmit and receive channels and for providing a first signal equal to said summation only when said summation results in a first polarity, means for summing a second group of particular signals of different polarities derived from said transmit and receive channels and providing a second signal equal to said second summation only when said second summation results in a second polarity, means for providing a difference signal whose polarity and magnitude is established by the difference between said first and second signals, means for comparing the magnitude of said difference signal against a threshold and for providing a threshold signal when said difference signal exceeds said threshold, and wherein the magnitude of said threshold signal is controllable by the polarity of said difference signal, means for exclusively providing either a first control signal responsive to a first threshold signal magnitude or a second control signal responsive to a second threshold signal magnitude, and means for generating complementary loss control signals for controlling the loss level of said transmit and receive variolossers, respectively, wherein said loss control signals have a first complementary relationship controlled by said first control signal and a second complementary relationship controlled by said second control signal.

9. The invention set forth in claim 8 wherein said loudspeaking circuit further comprises means for generating a transmit talk down signal, a transmit noise guard signal and a receive switch guard signal comprising said first group of signals.

10. The invention set forth in claim 8 wherein said loudspeaking circuit further comprises means for generating a receive talk down signal and a transmit switch guard signal comprising said second group of signals.

11. The invention set forth in claim 9 wherein said generating means includes at least one peak detector circuit and a noise level detector.

12. The invention set forth in claim 8 wherein said first control signal has a fixed magnitude and said second control signal has a varying magnitude.

13. The invention set forth in claim 12 wherein the varying magnitude of said second control signal is controllable by a volume control potentiometer.

14. A method for discerning the level of speech energy present in either a speakerphone transmit channel or receive channel and reducing the loss of that channel having the greater speech energy present while increasing the loss of the opposite channel, said method comprising the steps of deriving a transmit talk down signal, a transmit noise guard signal and a receive switch guard signal from said transmit and receive channels as a first group of signals, deriving a receive talk down signal and a transmit switch guard signal from said transmit and receive channels as a second group of signals, summing said first group of signals and providing a first signal equal to the result of said summation only if said transmit talk down signal outweighs the combination of said transmit noise guard signal plus said receive switch guard signal, summing said second group of signals and providing a second signal equal to the result of said summation only if said receive talk down signal outweighs said transmit switch guard signal, generating a difference signal based on the algebraic summation of said first and second signals, and controlling the loss of said transmit and receive channels in a complementary relationship controlled by the polarity of said difference signal, said step of controlling the loss in said transmit and receive channels including the step of comparing said difference signal against a threshold and blocking said difference signal if said threshold is not exceeded.

* * * * *

UNITED STATES PATENT AND TRADEMARK OFFICE
CERTIFICATE OF CORRECTION

PATENT NO. : 4,490,582

DATED : December 25, 1984

INVENTOR(S) : Verne E. Munson

It is certified that error appears in the above-identified patent and that said Letters Patent is hereby corrected as shown below:

Column 1, line 68, "4,002,954" should read --4,002,854--.
Column 2, line 68, "on" should read --or--.

Column 5, line 30, "lead" should read --leads--.
Column 9, line 37, "(Q313)" should read --(Q303)--.
Column 10, line 14, "0-1000" should read --0-100--.

Signed and Sealed this

Twentieth Day of August 1985

[SEAL]

Attest:

DONALD J. QUIGG

Attesting Officer     Acting Commissioner of Patents and Trademarks